United States Patent
Dutta et al.

(10) Patent No.: US 11,092,982 B2
(45) Date of Patent: Aug. 17, 2021

(54) TEMPERATURE SENSOR FOR COOLANT CONTROL VALVE

(71) Applicant: Schaeffler Technologies AG & Co. KG, Herzogenaurach (DE)

(72) Inventors: Biplob Dutta, Flint, MI (US); Raghunath Paralkar, Shelby Township, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 254 days.

(21) Appl. No.: 16/041,998

(22) Filed: Jul. 23, 2018

(65) Prior Publication Data

US 2020/0026312 A1    Jan. 23, 2020

(51) Int. Cl.
*G05D 7/06* (2006.01)
*G05D 23/19* (2006.01)

(52) U.S. Cl.
CPC ........... *G05D 7/0635* (2013.01); *G05D 23/19* (2013.01)

(58) Field of Classification Search
CPC .......... F16K 31/002; F16K 3/26; F16K 11/02; B60H 1/00485; G05D 23/02; G05D 23/022; G05D 23/08; Y10T 137/7737
See application file for complete search history.

(56) References Cited

U.S. PATENT DOCUMENTS

| | | | |
|---|---|---|---|
| 2,277,814 A * | 3/1942 | Booth | B60H 1/00485 237/2 A |
| 4,126,114 A * | 11/1978 | Davis | F01P 11/16 123/198 D |
| 4,883,225 A * | 11/1989 | Kitchens | F01P 7/16 236/34.5 |
| 5,123,436 A * | 6/1992 | Koechlein | G05D 16/0666 137/12 |
| 5,616,829 A * | 4/1997 | Balaschak | F16K 31/046 137/551 |
| 8,651,069 B2 * | 2/2014 | Borgia | G05D 23/1333 123/41.04 |
| 9,803,764 B2 | 10/2017 | Chang et al. | |
| 2004/0173167 A1 * | 9/2004 | Chanfreau | F01P 7/165 123/41.1 |
| 2004/0238159 A1 * | 12/2004 | Humburg | B60H 1/08 165/41 |
| 2005/0115619 A1 * | 6/2005 | Kawulka | E21B 43/12 137/625.33 |
| 2008/0245881 A1 * | 10/2008 | Peric | F16K 3/26 236/93 R |
| 2009/0056350 A1 * | 3/2009 | Germann | G05D 23/08 62/132 |
| 2012/0076640 A1 * | 3/2012 | Popp | F04D 15/0038 415/151 |
| 2012/0247582 A1 | 10/2012 | Lamb et al. | |
| 2014/0374495 A1 | 12/2014 | Malone | |
| 2016/0109891 A1 * | 4/2016 | Watts | G05D 23/022 236/99 K |
| 2017/0175613 A1 * | 6/2017 | Poisson | G05D 23/022 |
| 2018/0163609 A1 * | 6/2018 | Ge | G05D 23/1925 |

* cited by examiner

*Primary Examiner* — Jessica Cahill
(74) *Attorney, Agent, or Firm* — Matthew V. Evans

(57) ABSTRACT

A coolant control valve includes an actuator, at least one valve body, an outer housing, and a temperature sensor having a first flow state and a second flow state. The first and second flow states can be achieved by first and second axial positions of the temperature sensor.

16 Claims, 5 Drawing Sheets

TEMPERATURE SENSOR FOR COOLANT CONTROL VALVE

TECHNICAL FIELD

Example aspects described herein relate to coolant control valves (CCVs) for use within fluid cooling systems.

BACKGROUND

CCVs are known and can be arranged to provide coolant flow control for temperature management of various powertrain components including IC engines, transmissions and various components of hybrid electric and fuel cell vehicles.

A portion of CCVs are electro-mechanical in design, incorporating an electrical actuator assembly that interfaces with a mechanical valve body to provide a controlled flow of coolant for a selected powertrain component or system. Depending on its design, the mechanical valve body can be linearly actuated or rotary actuated by an actuator, often times in the form of an electric motor or solenoid. The valve body can be configured with one or more fluid openings that control an amount of coolant flow to or from one or more inlets or outlets arranged on an outer housing of the coolant control valve. Electro-mechanical CCVs can offer continuously variable positions of the valve body to achieve various coolant flow rates. Like many other electronic controlled engine components, a fail-safe design feature is required that facilitates safe operation of the engine in the event of a functional failure of the CCV.

SUMMARY

A CCV is provided that includes an actuator, at least one valve body actuated by the actuator, an outer housing, and a temperature sensor having a first flow state and a second flow state; the first flow state can be a zero flow state and the second flow state can be a non-zero flow state. The outer housing includes at least one inlet and at least one outlet. A seal can be arranged between the temperature sensor and the outer housing. The actuator can be configured to be provided electronic communication from an electronic controller to move the at least one valve body to a selected one of any angular position within a continuous range of angular positions. The temperature sensor can communicate electronically with the electronic controller to provide a fluid temperature.

The temperature sensor can have a displaceable body capable of a first axial position that corresponds to the first flow state, and a second axial position that corresponds to the second flow state. While in the second axial position, a passageway can be formed that connects an inner chamber of the coolant control valve to one of the at least one outlet, which can be in fluid communication with a fluid reservoir. The temperature sensor can be disposed directly within an outer housing or within an end-cap or any other component that attaches to the outer housing.

The temperature sensor can have a first force generator, potentially formed as a spring, which applies a biasing force to the displaceable body in a first axial direction. The temperature sensor or displaceable body is configured to receive an actuation force that overcomes the biasing force to achieve the second axial position. The actuation force can be provided by a pressurized fluid that contacts the temperature sensor. The actuation force can also be provided by a second force generator configured as a temperature sensor. The second force generator can include a wax material that expands with increasing temperature. The second force generator can include a rod that is configured to move the displaceable body, the rod displaceable by the wax material. The wax material can have a first temperature while in the first axial position, and a second temperature while in the second axial position, the second temperature greater than the first.

A method of operating a CCV is provided that includes: 1). Flowing pressurized fluid through a CCV that is configured with a temperature sensor; 2). Generating an actuation force that acts upon the temperature sensor, a displaceable body of the temperature sensor subjected to a biasing force in a first axial direction by a first force generator; 3). Overcoming the biasing force with the actuation force; and, 4). Moving the displaceable body in a second axial direction to a position that forms a passageway that fluidly connects an inner chamber of the CCV to an outlet. The generating an actuation force step can be provided by either a second force generator or a pressurized fluid.

BRIEF DESCRIPTION OF THE DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

DETAILED DESCRIPTION OF THE EMBODIMENTS

Figure 1:
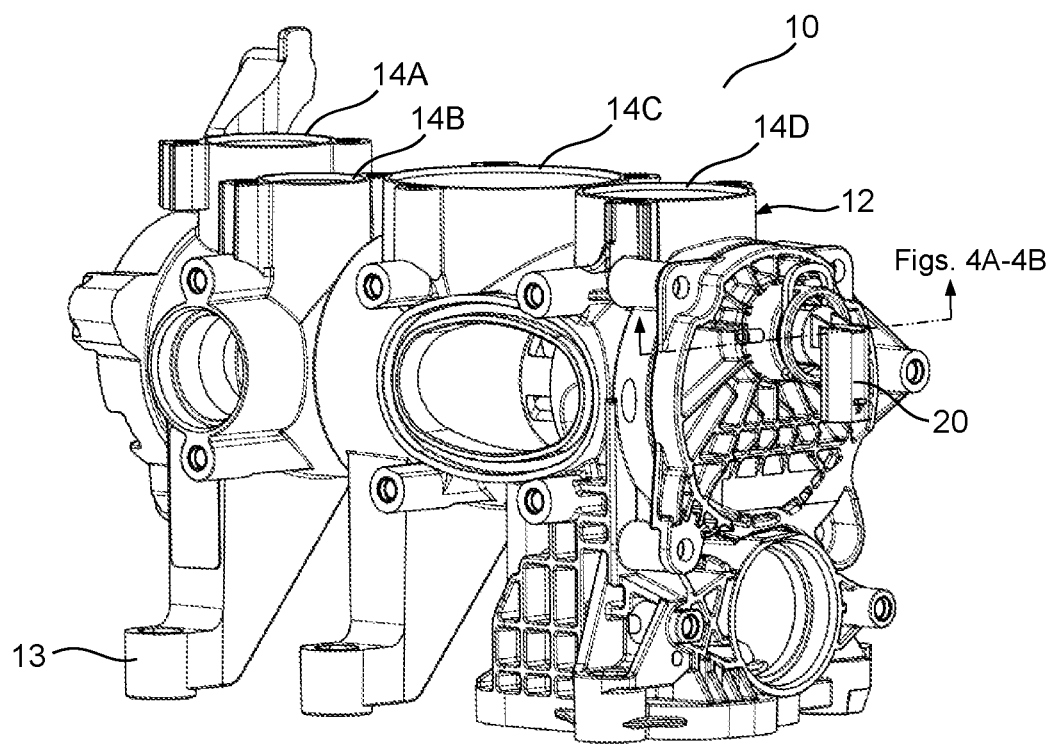
FIG. 1 is a perspective view of a coolant control valve (CCV) having an example embodiment a temperature sensor with a first flow state and a second flow state.

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. Circumferentially refers to an outer boundary of a circle or curve. The words "left" and "right" designate directions in the drawings to which reference is made. The terminology includes the words specifically noted above, derivatives thereof, and words of similar import.

Figure 2:
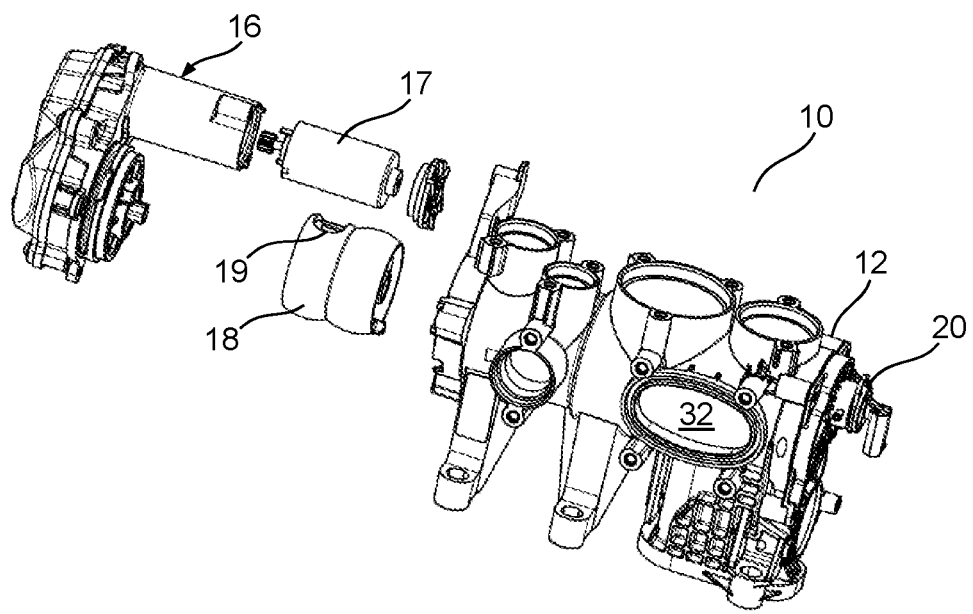
FIG. 2 is a partially exploded perspective view of the CCV of FIG. 1.
Figure 3:
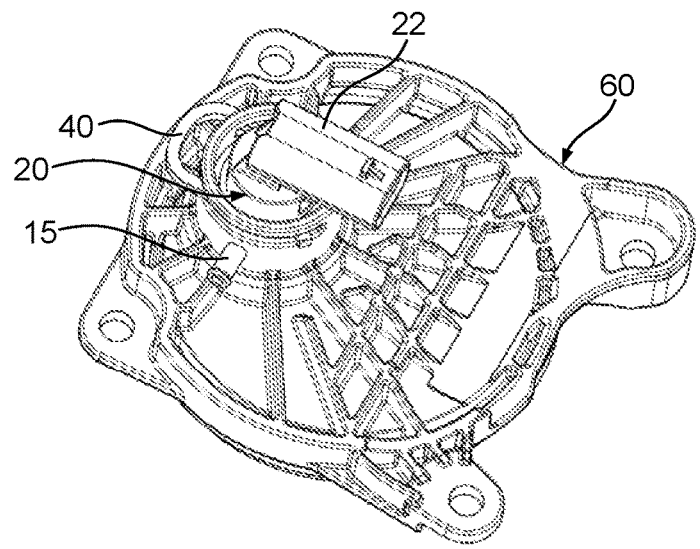
FIG. 3 is a perspective view of the temperature sensor and housing portion of FIG. 1.
Figure 4A:
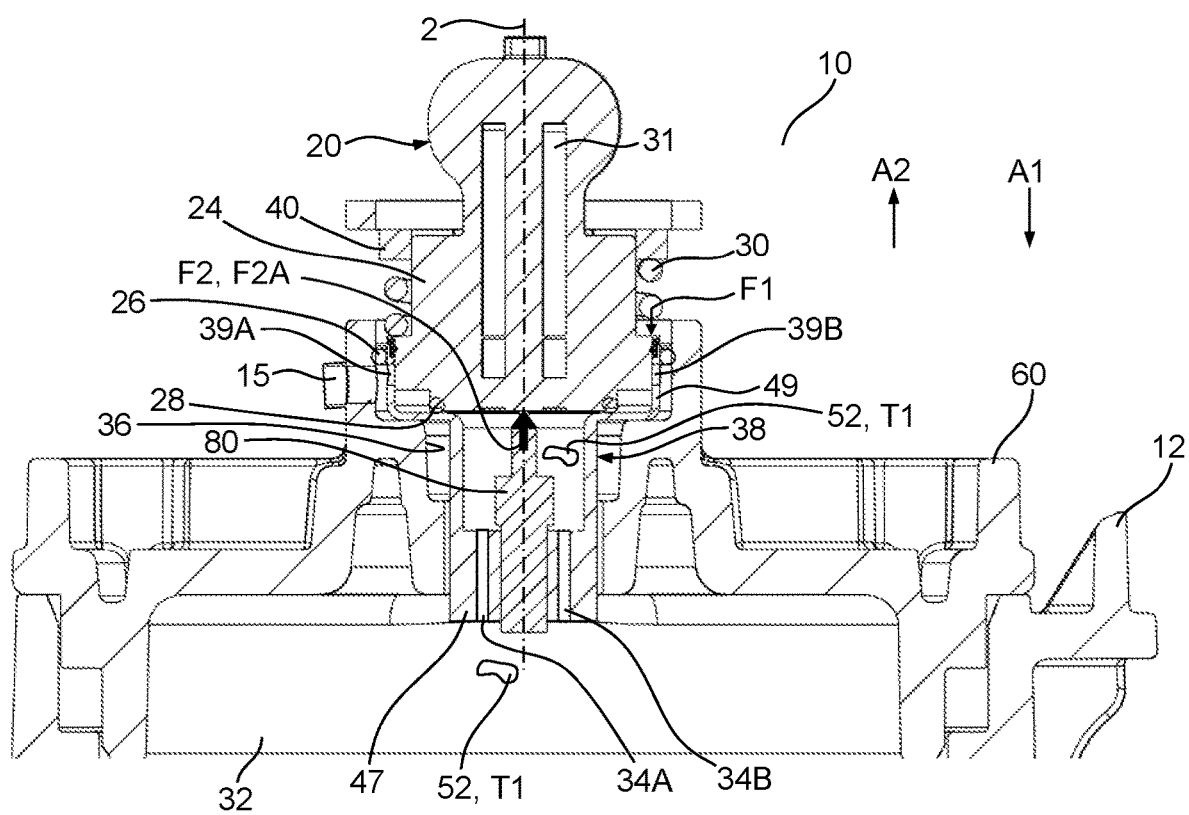
FIG. 4A is a partial cross-sectional view of the CCV of FIG. 1, showing the temperature sensor in a first flow state.
Figure 4B:
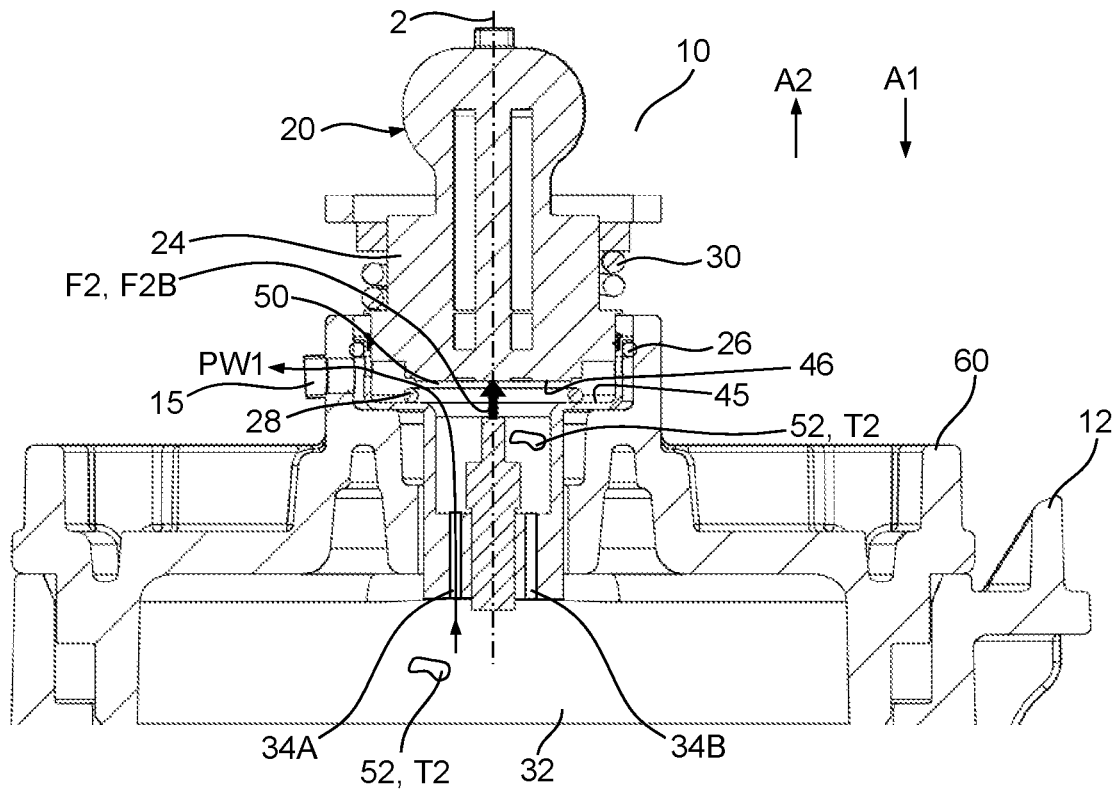
FIG. 4B is a partial cross-sectional view of the CCV of FIG. 1, showing the temperature sensor in a second flow state.
Figure 5:
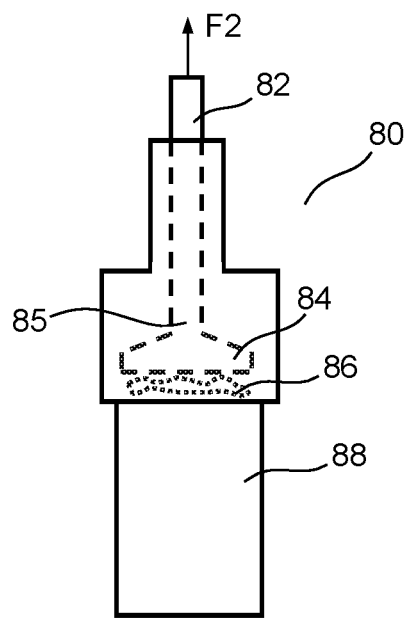
FIG. 5 is a side view of an example embodiment of a second force generator for temperature sensor actuation.

FIG. 1 shows a perspective view of a coolant control valve (CCV) 10 that includes a temperature sensor 20 having a first flow state and a second flow state. FIG. 2 shows an exploded perspective view of the CCV 10 of FIG. 1. FIG. 3 shows a perspective view of the temperature sensor 20 installed within an end-cap 60 that is arranged on an outer housing 12 of the CCV 10. FIG. 4A is a partial cross-sectional view of the CCV 10, showing the temperature sensor 20 in a first axial position that corresponds to a first flow state, while FIG. 4B is a partial cross-sectional view of the CCV 10, showing the temperature sensor in a second axial position that corresponds to a second flow state. FIG. 5 is a side view of an example embodiment of a second force generator 80 for actuation of the temperature sensor 20. The following discussion should be read in light of FIGS. 1 through 5.

The outer housing 12 of the CCV 10 is configured to be attached to an IC engine (not shown) via one or more mounting feet 13. Other designs or features that facilitate attachment of the CCV 10 could also suffice. Additionally, the CCV 10 does not have to attach to an IC engine, but can be attached to any receiving structure or mounting base. The outer housing 12 is configured with openings 14A-14D, which can serve as either inlets or outlets for the CCV 10. Coolant flow within each of the openings 14A-14D is managed by a valve body 18 that is disposed within the outer housing 12. The valve body 18 can be formed with one or more spherical segments and can be configured with at least one fluid opening 19; however, any shape can be utilized for the valve body 18 to facilitate fluid flow control. The amount of fluid flow through the openings 14A-14D can be controlled by rotational actuation of the valve body 18 by an actuator assembly 16. The actuator assembly 16 can have, for example, an electric motor 17 that rotates the valve body 18 to a desired angular or rotational position. Other actuator designs, including linear actuators, are possible. In an example embodiment, the actuator assembly 16 can move the valve body 18 to a selected one of any angular position within a continuous range of angular positions; alternatively stated, the angular position of the valve body 18 is continuously variable. An amount of coolant flow through any one of the openings 14A-14D is controlled by an amount of overlap between the at least one fluid opening 19 and its respective opening 14A-14D in the outer housing 12.

The temperature sensor 20 is disposed within the outer housing 12, or, more specifically, the end-cap 60 of the outer housing 12. The temperature sensor 20 could be located anywhere within or on the outer housing 12 or any component that is attached to the outer housing 12. The phrase "disposed within the outer housing 12" is meant to signify any location within or on the outer housing 12 or any component that attaches to the outer housing 12. The temperature sensor 20 includes a central axis 2, an electrical connector 22, at least one temperature sensing element 31, a first force generator 30, a displaceable body 24, and a retention clip 40. The electrical connector facilitates electronic communication between the temperature sensor 20 and an electronic controller 90 (shown in FIG. 7). In addition to providing temperature feedback, the temperature sensor 20 is capable of moving axially along the central axis 2 to achieve different flow states. FIG. 4A depicts a first axial position that corresponds to a first flow state, and FIG. 4B depicts a second axial position that corresponds to a second flow state. The first flow state can be a zero flow state and the second flow state can be a non-zero flow state. Many different sealing arrangements are possible to facilitate sealing of the temperature sensor 20 to the end-cap 60 that is attached to the outer housing 12. As shown, the displaceable body 24 of the temperature sensor 20 is received by an optional motion guide 38 that may either be integrated with the temperature sensor 20 or provided as a separate component that is installed within a sensor bore 36 of the end-cap 60; the optional motion guide 38 could also be installed within a sensor bore that is integrated within the outer housing 12, potentially eliminating the end-cap 60. A radial seal 26 can be arranged within the sensor bore 36, and an axial seal 28 can be arranged between an axial face 45 of the motion guide 38 and an axial face 46 of the displaceable body 24. The first force generator 30 provides a biasing force F1 on the displaceable body 24 in a first axial direction A1, as shown in FIG. 4A, such that the axial seal 28 prevents coolant flow from exiting the CCV 10, achieving a zero flow state. The first force generator 30 can be formed as a spring (as shown), resilient element, or any other component that provides a force.

A second force generator 80 can be integrated either within the outer housing 12, the motion guide 38 or any other component within the temperature sensor 20. The second force generator 80 can provide an actuation force F2 that acts on the displaceable body 24 in a second axial direction A2; when the actuation force F2 exceeds the biasing force F1 of the first force generator 30, the displaceable body 24 moves to the second axial position. Referring to FIG. 4B, in this second axial position, a passageway 50 is formed by the displaceable body 24 that fluidly connects an inner chamber 32 of the CCV 10 to an outlet 15 arranged within the outer housing 12.

An example embodiment of the second force generator 80 is shown in FIG. 5 with hidden lines for clarity of its inner components. The second force generator 80 includes a rod 82 that is actuatable by a wax material 86. The volume of wax material increases with temperature, therefore, as temperature increases, the actuation force F2 generated by the rod increases. Given this characteristic of wax and its presence within the second force generator 80, it could be stated that the second force generator 82 is also a temperature sensor. An actuatable end 85 of the rod 82 is configured with an enlarged portion 84 that interfaces with the wax material 86. Many different forms of the housing 88 are possible in order to package the second force generator 80 within the outer housing 12 of the CCV 10. Furthermore, other forms of the second force generator 80 are possible than what is shown in FIG. 5.

Referring to FIG. 4A through FIG. 5, the function of the second force generator 80 will now be described. With view to FIG. 4A, a fluid 52 with a first temperature T1 resides within the outer housing 12 and flows around the second force generator 80 with the aid of first fluid apertures 34A, 34B, facilitating convective heat transfer from the fluid 52 to the second force generator 80 and its internal components. The fluid 52 can be engine coolant or any other fluid that flows through the CCV 10. In the first axial position, the second force generator 80 provides a force F2A that is less than the biasing force F1 of the first force generator 30; therefore, the displaceable body 24 of the temperature sensor 20 remains in a seated position. In this first axial position, the axial seal 28 prevents the fluid 52 from exiting the CCV 10 through the outlet 15, achieving a zero flow state.

Now referring to FIG. 4B with view to FIG. 5, the second axial position of the temperature sensor 20 is shown. The fluid 52 with a second temperature T2 circulates around the second force generator 80, causing the wax material 86 to expand and actuate the rod 82 in the second axial direction A2 with a force F2B that exceeds the biasing force F1 of the first force generator 30. The rod 82 moves the displaceable body 24 of the temperature sensor 20 in the second axial direction A2 forming a passageway 50 that fluidly connects the inner chamber 32 of the CCV 10 to the outlet 15; thus, the second axial position achieves a non-zero flow state for the fluid 52 flowing through the outlet 15. Furthermore, a fluid within the outer housing 12 can take a pathway P1 to exit the outer housing 12 in an instance of excessive fluid temperatures being present inside of the CCV 10. The fluid pathway P1 can include first fluid apertures 34A, 34B that are configured within a bottom portion 47 of the motion guide 38 and second fluid apertures 39A, 39B that are configured within a top portion 49 of the motion guide 38.

Systematic calibration of the second force generator 80 and the first force generator 30 can be achieved such that the actuation force F2 of the second force generator 80 exceeds the biasing force F1 of the first force generator 30 at a critical temperature Tcr of the fluid 52, facilitating axial movement of the displaceable body 24 in the second axial direction A2. The critical temperature Tcr could be a temperature that is harmful to the CCV 10 or any component whose temperature is being managed by the CCV 10. A mathematical formula representing this relationship is shown below:

If T≥Tcr, then F2>F1

Where: T=temperature of fluid 52
Tcr=critical temperature of fluid 52
F1=force provided by first force generator 30
F2=force provided by second force generator 80

Figure 6A:
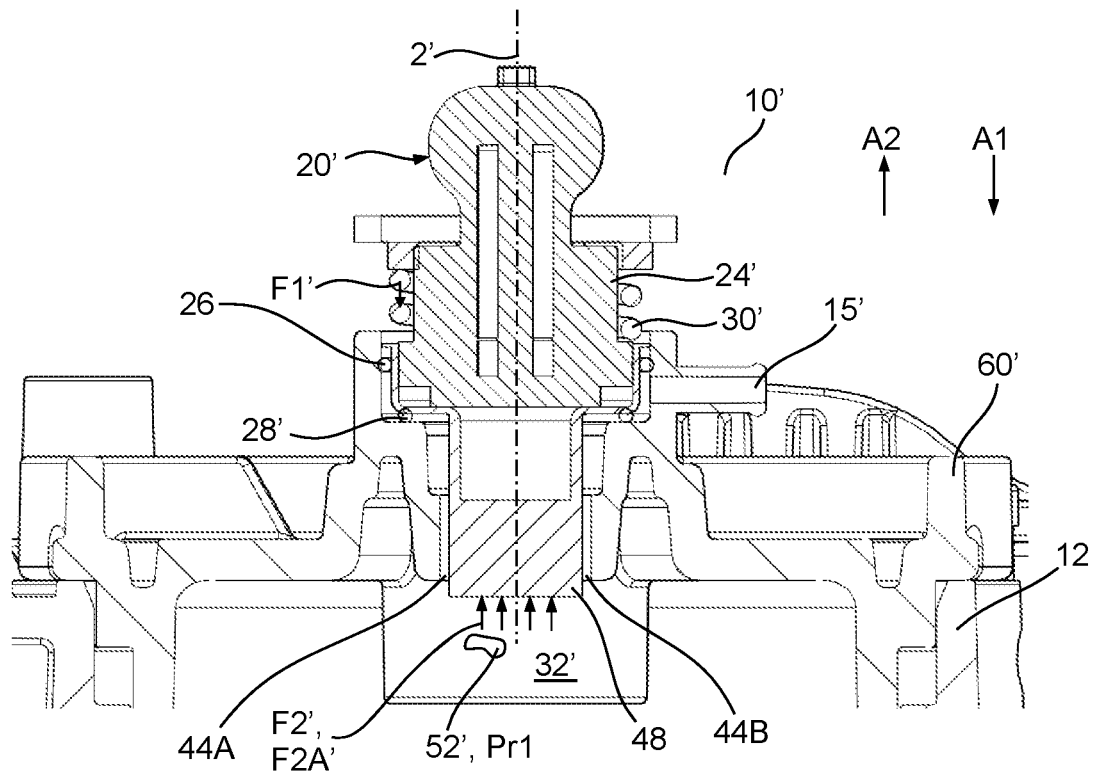
FIG. 6A is a partial cross-sectional view of an example embodiment of a temperature sensor disposed within a CCV housing, the temperature sensor in a first flow state.
Figure 6B:
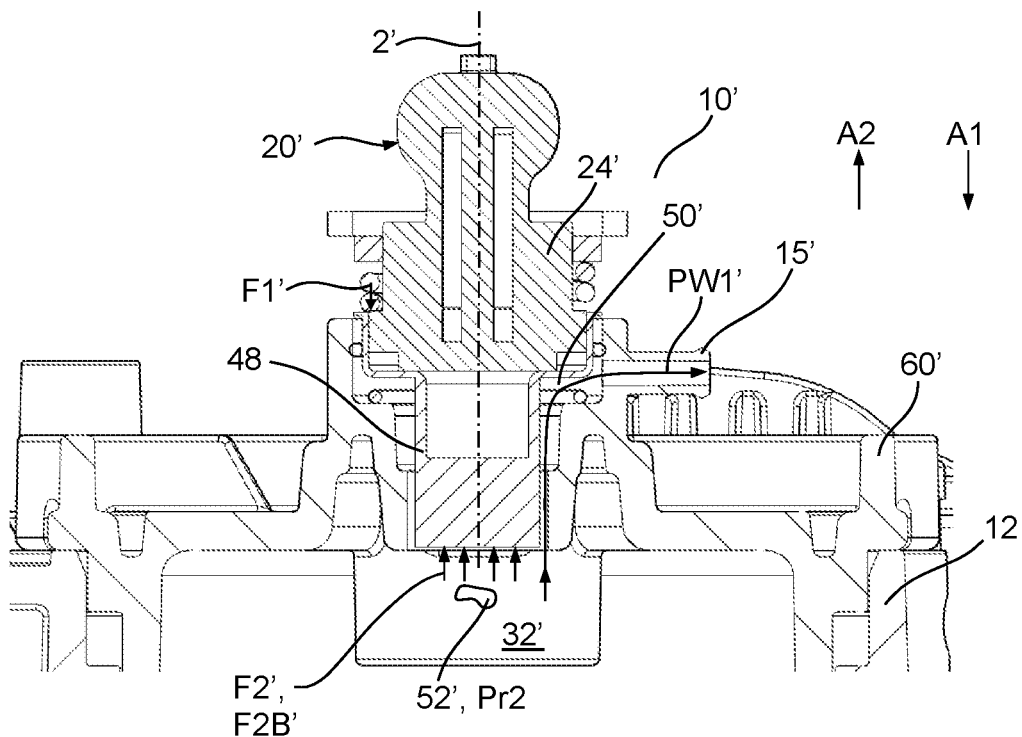
FIG. 6B is a partial cross-sectional view of an example embodiment of a temperature sensor disposed within a CCV housing, the temperature sensor in a second flow state.

FIGS. 6A and 6B show an example embodiment of a temperature sensor 20' in respective first and second axial positions. The temperature sensor 20', installed within an end-cap 60' arranged on the outer housing 12 of a CCV 10', includes a central axis 2', a displaceable body 24', a first force generator 30', a housing 48, and an axial seal 28'. The first force generator 30' applies a biasing force F1' on the displaceable body 24' in the first axial direction A1. For this example embodiment, an actuation force F2' to move the temperature sensor 20' to its second axial position is provided by pressurized fluid.

Referring to FIG. 6A, the first axial position of the temperature sensor 20' is shown. A fluid 52' with pressure Pr1 circulates against a housing 48 of the temperature sensor 20', providing a resultant actuation force F2A' acting in a second axial direction A2 on the housing 48. First fluid apertures 44A, 44B formed in the end-cap 60' can facilitate increased circulation of the fluid 52', and, thus, contact area of the housing 48 by the fluid 52'; however, these first fluid apertures 44A, 44B but could be eliminated. The fluid 52' could also circulate or contact directly on the displaceable body 24' or any other component of the temperature sensor 20'. In the first axial position, the resultant actuation force F2A' does not exceed the biasing force F1' provided by the first force generator 30', and an axial seal 28' arranged between the housing 58 and the end-cap 60' prevents any fluid from exiting the CCV 10' through an outlet 15'.

Referring to FIG. 6B, the second axial position of the temperature sensor 20' is shown, in which a resultant actuation force F2B' created by the fluid 52' at a pressure Pr2 on the housing 48 exceeds the biasing force F1' of the first force generator 30'. In this second axial position, a passageway 50' is formed by the displaceable body 24' that fluidly connects the inner chamber 32' of the CCV 10' to the outlet 15'. Therefore a fluid within the outer housing 12 can take a pathway PW1' to exit the outer housing 12 in an instance of excessive fluid pressures being present inside of the CCV 10'. The fluid pathway PW1' can include first fluid apertures 44A, 44B that are formed in the end-cap 60'. Many alternative designs for the temperature sensor 20' are possible, including those that eliminate the housing 48 such that the fluid 52 directly contacts the displaceable body 24'. Additional design modifications could facilitate installation of the temperature sensor 20' at a different location on the outer housing 12, or potentially on another component that attaches to the outer housing besides the end-cap 60'.

A method of operating the previously described CCVs 10, 10' is provided that includes: 1). Flowing pressurized fluid through a CCV 10, 10' that is configured with a temperature sensor 20, 20'; 2). Generating an actuation force F2, F2' that acts upon the temperature sensor 20, 20', a displaceable body 24, 24' of the temperature sensor 20, 20' subjected to a biasing force F1, F1' in a first axial direction A1 by a first force generator 30, 30'; 3). Overcoming the biasing force F1, F1' with the actuation force F2B, F2B'; and, 4). Moving the displaceable body 24, 24' in a second axial direction A2 to a position that forms a passageway 50, 50' that fluidly connects an inner chamber 32, 32' of the CCV 10, 10' to an outlet 15, 15'. The generating an actuation force step can be provided by either a second force generator 80 or a pressurized fluid 52'.

Figure 7:
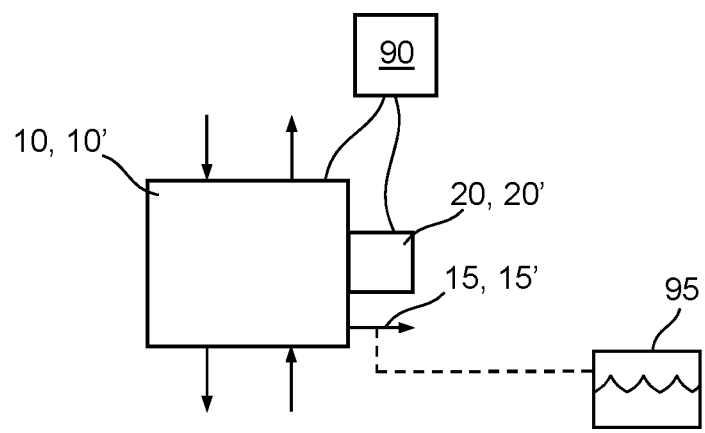
FIG. 7 is a schematic representation of a CCV together with an electronic controller and a coolant reservoir.

FIG. 7 shows a schematic representation of the CCV 10, 10' together with an electronic controller 90 and a fluid receiver or fluid reservoir 95. The electronic controller 90 can communicate electronically with the temperature sensor 20, 20' and also communicate electronically with the CCV 10, 10' to control fluid flow to or from the CCV 10, 10'. The fluid receiver or fluid reservoir 95 can be fluidly connected to an outlet 15, 15' of the CCV 10, 10' to serve as a storage place for fluid that has been expelled from the CCV 10, 10' due to an excessive fluid temperature or excessive fluid pressure condition.

The temperature sensor 20, 20' can provide an additional fail-safe mode in addition to sensing and communicating fluid temperature. This fail-safe mode can prevent component or engine failure due to an excessive fluid temperature or pressure within the CCV 10, 10'. However, the described axial positions and corresponding flow states can also be utilized in a non-fail-safe manner to provide additional functions for the CCV 10, 10'. For example, the second axial position of the temperature sensor 20, 20' could be achieved by a non-critical temperature or a non-critical pressure of the fluid 52, 52' within the CCV 10, 10'. Furthermore, in the second axial position, fluid 52, 52' could exit the CCV 10, 10' and flow to any fluid receiver, such as a component or system.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What we claim is:

1. A coolant control valve comprising:
    an actuator;
    at least one valve body actuated by the actuator;
    an outer housing having:
        at least one inlet; and,
        at least one outlet; and,
        a temperature sensor having:
            a displaceable body movable to: i) a first axial position corresponding to a zero flow state, and ii) a second axial position corresponding to a non-zero flow state, the displaceable body including:
                a force generator;
                an electrical connector; and,
                a temperature sensing element configured to provide a fluid temperature to an electronic controller via the electrical connector.

2. The coolant control valve of claim 1, further comprising a seal arranged between the temperature sensor and the outer housing.

3. The coolant control valve of claim 1, wherein the actuator is configured to move the at least one valve body to a selected one of any angular position within a continuous range of angular positions.

4. The coolant control valve of claim 1, wherein in the second axial position a passageway is formed that fluidly connects an inner chamber of the coolant control valve to one of the at least one outlet.

5. The coolant control valve of claim 1, wherein the force generator provides a biasing force on the displaceable body in a first axial direction.

6. The coolant control valve of claim 5, wherein the temperature sensor is configured to receive an actuation force that overcomes the biasing force to achieve the second axial position.

7. The coolant control valve of claim 6, wherein the actuation force is provided by a pressurized fluid that contacts the temperature sensor.

8. The coolant control valve of claim 6, wherein the actuation force is provided by a second temperature sensor.

9. The coolant control valve of claim 8, wherein the second temperature sensor comprises a wax material.

10. The coolant control valve of claim 9, wherein the second temperature sensor further comprises a rod that is configured to move the displaceable body, the rod axially displaceable by the wax material.

11. The coolant control valve of claim 9, wherein the wax material has a first temperature while in the first axial position, and a second temperature while in the second axial position, the second temperature greater than the first temperature.

12. A method of operating a coolant control valve, comprising:
    flowing pressurized fluid through the coolant control valve, the coolant control valve comprising a first temperature sensor having a displaceable body, the displaceable body including:
        an electrical connector; and,
        a temperature sensing element configured to provide a fluid temperature of the pressurized fluid to an electronic controller via the electrical connector;
    generating an actuation force that acts upon the first temperature sensor, the displaceable body of the first temperature sensor subjected to a biasing force in a first axial direction by a first force generator;
    overcoming the biasing force with the actuation force; and,
    moving the displaceable body in a second axial direction to a position that forms a passageway that fluidly connects an inner chamber of the coolant control valve to an outlet.

13. The method of claim 12, wherein the generating an actuation force step is provided by the pressurized fluid.

14. The method of claim 12, wherein the generating an actuation force step is provided by a second temperature sensor.

15. A coolant control valve comprising:
    an actuator;
    at least one valve body actuated by the actuator;
    an outer housing having:
        at least one inlet; and,
        at least one outlet; and,
        a temperature sensor having:
            a first temperature sensor configured to electronically communicate a temperature to an electronic controller, the first temperature sensor having a first flow state and a second flow state; and,
            a second temperature sensor configured to actuate the first temperature sensor to the first or second flow state.

16. The coolant control valve of claim 15, wherein in the second flow state, a passageway is formed between the first temperature sensor and the outer housing, the passageway fluidly connecting an inner chamber of the coolant control valve to one of the at least one outlet.

* * * * *